United States Patent [19]

Canaan et al.

[11] Patent Number: 4,909,271

[45] Date of Patent: Mar. 20, 1990

[54] ULTRAHIGH PURITY GAS VALVE WITH ENCAPSULATED BELLOWS

[75] Inventors: Mark A. Canaan; Joseph H. Nichols, both of San Luis Obispo, Calif.; Charles M. Obermeyer, Littleton, Colo.; Ronald G. Hendry, Los Osos, Calif.

[73] Assignee: Cryolab, Inc., San Luis Obispo, Calif.

[21] Appl. No.: 337,924

[22] Filed: Apr. 14, 1989

[51] Int. Cl.⁴ .................. F16K 31/44; F16K 41/00
[52] U.S. Cl. ......................... 137/240; 251/335.3; 251/273
[58] Field of Search ................. 251/335.3, 273; 137/240

[56] References Cited

U.S. PATENT DOCUMENTS

| 2,743,738 | 5/1956 | Johnson | 251/335.3 X |
| 4,166,607 | 9/1979 | Webb | 251/335.3 |
| 4,421,298 | 12/1983 | Kujawski | 251/335.3 X |

Primary Examiner—Arnold Rosenthal
Attorney, Agent, or Firm—Daniel C. McKown

[57] ABSTRACT

In an ultrahigh purity sealed gas valve of the Y-type having a bellows located in a stem bore, a second seat is provided so that the seat seal engages the second seat to seal off the space within the bonnet tube and the bellows from communicating with the gas flow path, thereby preventing contaminating particles from the bellows from entering the gas system and also decreasing the dead space presented to the closed gas system by the valve. A purge port is located between the open and closed positions of the seat seal thereby permitting purging gas to bathe the sealing members and the bellows in both positions.

2 Claims, 2 Drawing Sheets

ULTRAHIGH PURITY GAS VALVE WITH ENCAPSULATED BELLOWS

BACKGROUND OF THE INVENTION

The present invention is in the field of sealed valves, and more particularly relates to a bellows-type valve that introduces very little contamination to the gas passing through it and that has an extremely low leak rate. Such valves find application in the semiconductor industry.

Two main types of valves that have been used in such applications are the diaphragm valve and the bellows valve. The diaphragm valve requires the use of nonlinear gas flows which can cause turbulance that might provoke the production of small particles and that might cause undesired pressure drops across the valve. The present invention is of the second type, in which the seat seal is attached to the end of a bellows that accommodates movement of the seat seal between the open and closed positions.

Traditional concerns regarding the use of bellows valves include the large area of the convoluted surface of the bellows and the large dead space of the chamber in which the bellows is housed.

Another traditional concern is that because the bellows is housed in a cylindrical chamber that extends away from the main flow path of the gas through the valve, the flow of gases cannot be relied upon to flush away contaminating particles from within the dead space immediately surrounding the bellows.

In spite of these disadvantages of bellows valves, such valves have redeeming features including a "straight through" gas flow path, a minimum of turbulance and a high flow coefficient.

As will be seen below, the present invention is directed at reducing the aforementioned disadvantages of the prior art bellows valves while retaining their advantages.

SUMMARY OF THE INVENTION

In accordance with the present invention, a bellows-type valve is provided with a second valve seat so located that when the valve is in its full open condition, the seat seal bears against the second seat to seal off from the gas flow path the chamber in which the bellows is contained. When the valve is full open, the bellows is thus encapsulated in its chamber, and neither the chamber nor the bellows can contribute any particles to the gas flowing through the valve. Once the second seal has been effected, the dead space between the bellows and its surrounding chamber is no longer in communication with the flow path of the gas through the valve. These favorable results are made possible by the use of a metal-to-metal seal between the valve body and the bonnet tube, as will be described below.

In a second aspect of the present invention, a purge port is located between the first and second valve seats so as to permit purging of the valve in both the full open and the closed positions and to permit purging gas to flow over whichever set of sealing surfaces are not in use, thereby preparing them for use.

Thus, the valve of the present invention eliminates the most serious disadvantages of a bellows valve and retains the advantageous features of such valves.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 1:
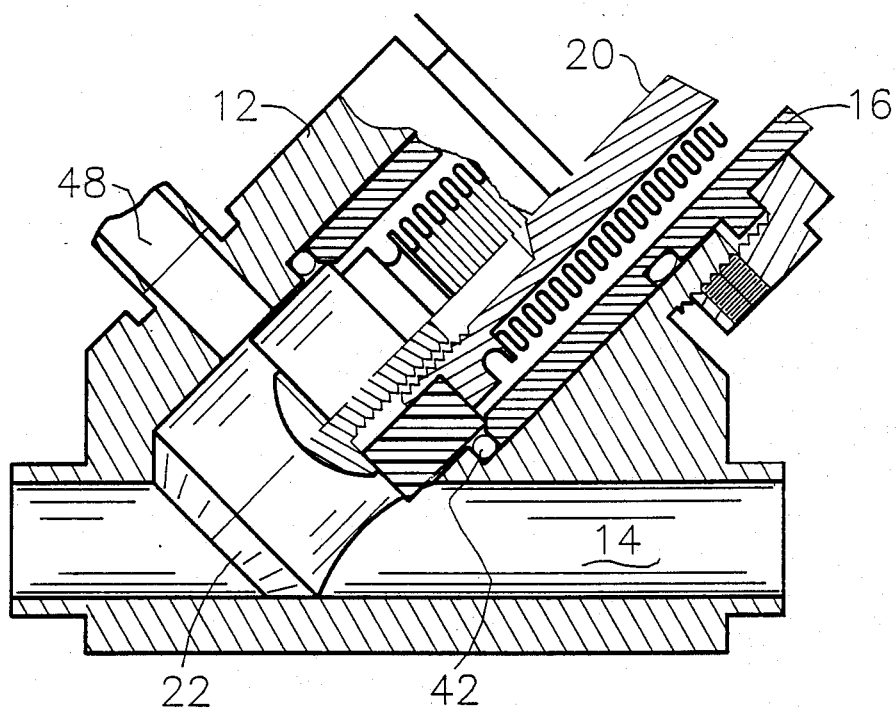
FIG. 1 is a partially cut away side elevational cross sectional view of the valve of the preferred embodiment in the full open position.
Figure 2:
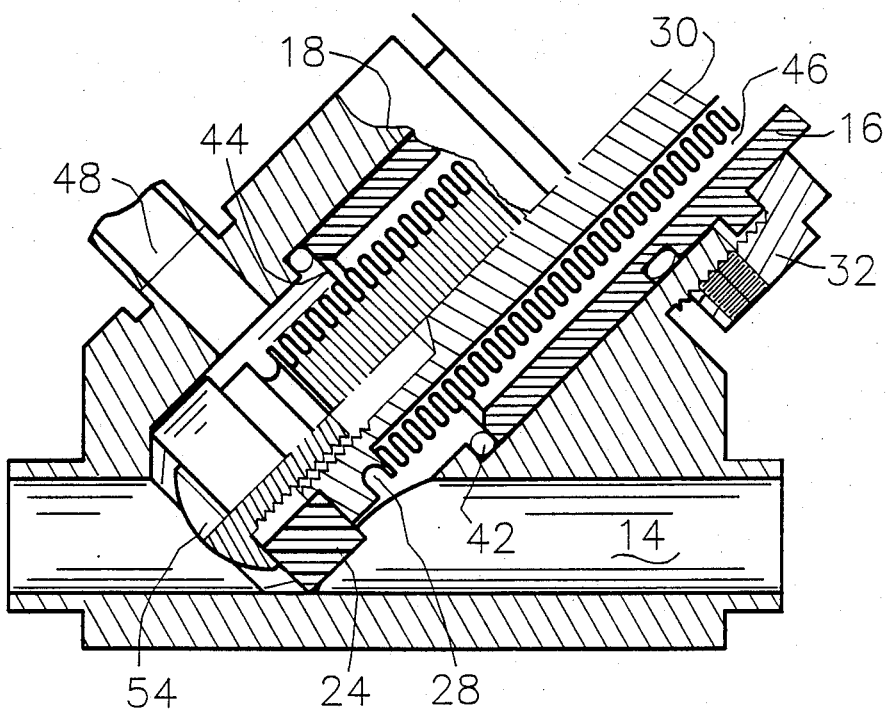
FIG. 2 is a partially cut away side elevational cross sectional view showing the valve of FIG. 1 in the closed position; and, FIG. 3 is a side elevational cross sectional view partially cut away and showing the handle portion of the valve of FIG. 1.
Figure 3:
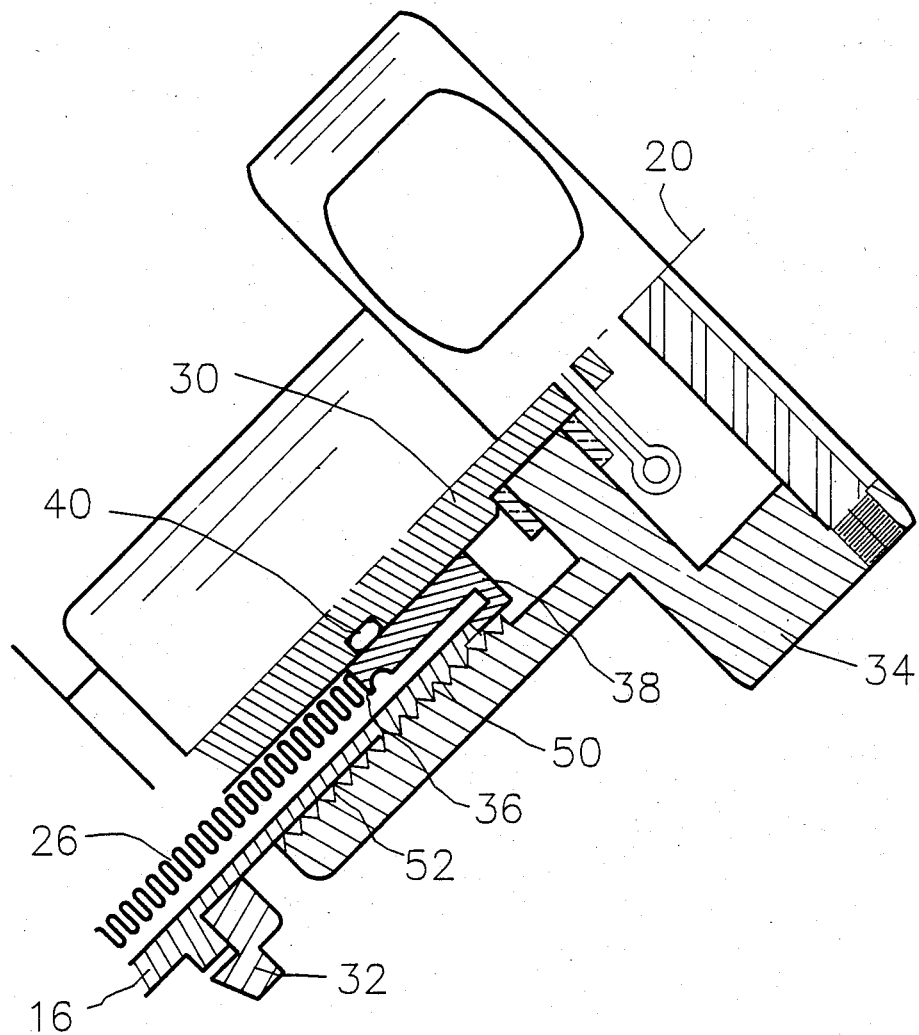

FIGS. 1-3 relate to the same preferred embodiment. The valve body 12 includes a flow path bore 14 through which gas flows in the direction indicated when the valve is open. The body 12 also includes a stem bore 18 that is a figure of revolution about the stem axis 20.

A bonnet tube 16 fits into the stem bore 18 and is held in place by the bonnet nut 32. The bonnet tube 16 supports the handle 34 and has the overall form of a hollow cylinder that provides a chamber for the bellows 26. The upper end 36 of the bellows 26 is welded to a cap 38 to which the bonnet tube 16 is also welded. In this manner, the volume within the bonnet tube 16 is partitioned into two non-communicating spaces. The first space is inside the bellows, and that space is separate from the sealed system within which the gas flows. However, it is desirable to keep moisture from penetrating into this space, and therefore an 0-ring moisture seal 40 is provided. The second space within the bonnet tube is the space between the outside of the bellows and the inside wall of the bonnet tube. That space communicates with the sealed system within which the gas flows.

The lower end of the bonnet tube 16 is sealed to the body 12 by a metal-to-metal bonnet tube seal 42. If the bonnet tube 16 were welded to the body 12, it would be impossible to disassemble the valve for cleaning or repairs, due to the relative diameters of the parts. Therefore, some type of seal is needed, and only a metal-to-metal seal is capable of providing the degree of integrity required; i.e., leak rates on the order of $10^{-13}$ standard cubic centimeters of helium per second. Thus, the use of the metal-to-metal seal 42 was a crucial turning point in the design of this embodiment of the invention.

The lower end of the bonnet tube 16 is shaped to provide a second seat 44 against which the seat seal 24 bears in sealing engagement when the valve is in its full open position shown in FIG. 1. In this way, the second space 46 within the bonnet tube 16 is sealed off from the system in which the gas flows when the valve is in its full open position. This sealing off or encapsulation of the bellows when the valve is in its full open position prevents any undesirable particles released from the bellows from getting into the sealed gas flow system. Further, this sealing off of the second space 46 decreases the dead space that the valve presents to the closed gas system.

Referring now to FIG. 2, when the valve is in its closed position, the seat seal 24 bears against the first seat 22 in sealing engagement.

The body 12 is provided with a purge port 48 that is located between the extreme positions of the seat seal 24. In this way, when the valve is closed, as it would be during installation, a flow of purge gas introduced through the purge port 48 bathes the bellows and the second space 46, as well as the second seat 44 and the seat seal 24 to remove from them any contaminating particles prior to opening of the valve.

When the valve is in its full open position shown in FIG. 1, the purging gas introduced through the purge port 48 bathes the first seat 22 and the portions of the seat seal 24 that will bear against the first seat 22.

In the preferred embodiment, the seat seal is formed of a clean plastic identified as KEL F.

Referring to FIG. 3, the outside of the upper end of the bonnet tube 16 includes threads 50 which engage a set of threads 52 of the handle 34. As the handle is turned, the handle moves in the axial direction pushing or pulling the stem 30 in the axial direction. The stem 30 resides in the first space (within the bellows 26) and extends the full length of the bellows. The lower end of the bellows is welded to the bellows adapter 28, and the stem 30 is connected to the bellows adapter 28 by the screw 54. Thus, rotation of the handle 34 moves the stem 30 axially, which also moves the seat seal 24 axially to open or close the valve.

It is seen that the provision of the second seat 44 in the valve of the present invention permits the bellows 26 and the dead space within the bonnet tube 16 to be encapsulated so long as the valve is in the full open position, thereby preventing any contaminating particles that may be present on the bellows or in the bonnet tube from reaching the gas flow path.

It is further seen that locating the purge port 48 between the open and closed positions of the seat seal permits the purging gas to bathe the more critical sealing surfaces.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. An ultrahigh purity sealed gas valve comprising in combination:
    a body having a gas flow path extending through it, having a first seat encircling the gas flow path, and having a stem bore inclined to the gas flow path;
    a bonnet tube having a generally hollow cylindrical shape, having a first end located inside the stem bore of said body and having a second end outside said body, the first end having an outside diameter sized to fit into the stem bore of said body in a tight sliding fit, having a second seat located adjacent the first end, and having an inside diameter;
    a metal-to-metal seal at the first end of said bonnet tube, sealing the first end to said body;
    a bellows having a first end located adjacent the first end of said bonnet tube, having a second end adjacent the second end of said bonnet tube, and having a diameter less than the inside diameter of said bonnet tube;
    cap means joined to the second end of said bonnet tube and to the second end of said bellows so as to produce a leakproof closure to the space between said bellows and said bonnet tube;
    a bellows adapter joined to the first end of said bellows and thereby producing a leakproof closure to the first end of said bellows;
    whereby said bellows partitions the space inside said bonnet tube into a first space inside said bellows and a second space between said bellows and said bonnet tube, the first space being isolated from the gas flow path and the second space communicating with the gas flow path except when the valve is in its full open condition;
    a seat seal attached to said bellows adapter;
    means for moving said seat seal from a first position in which it bears in sealing engagement against the first seat of said body to a second position in which it bears in sealing engagement against the second seat of said bonnet tube;
    whereby in the second position said seat seal closes off the second space from the gas flow path, thereby encapsulating said bellows within said bonnet tube so that neither said bonnet tube nor said bellows can contribute any particles to the gas flowing through the valve.

2. The ultrahigh purity sealed gas valve of claim 1 wherein said body further comprises a purge port located between the first seat of said body and the second seat of said bonnet tube;
    whereby, when said seat seal is in the first position, a purging gas entering the valve through said purge port will bathe said bellows, the second space, the second seat, and the portions of said seat seal that will bear against the second seat when said seat seal is returned to the second position; and when said seat seal is in the second position, the purging gas will bathe the first seat and the portions of said seat seal that will bear against the first seat when said seat seal is returned to the first position.

* * * * *